United States Patent [19]

Cole

[11] Patent Number: 4,988,436
[45] Date of Patent: Jan. 29, 1991

[54] AQUARIUM FILTRATION SYSTEM WITH LIQUID DISTRIBUTOR AND PROTEIN SKIMMER

[76] Inventor: Larry Cole, 829 Rockledge, Garland, Tex. 75043

[21] Appl. No.: 419,908
[22] Filed: Oct. 11, 1989
[51] Int. Cl.⁵ .............................................. A01K 63/04
[52] U.S. Cl. .................................. 210/169; 210/416.2; 119/5
[58] Field of Search ................. 239/504, 520; 210/169, 210/416.2; 119/5

[56] References Cited

U.S. PATENT DOCUMENTS

| | | | |
|---|---|---|---|
| 1,745,297 | 1/1930 | Harry | 239/504 |
| 3,669,883 | 6/1972 | Hucksted et al. | 210/169 X |
| 3,957,017 | 5/1976 | Carmignani et al. | 119/3 |
| 3,962,085 | 6/1976 | Liston et al. | 210/131 |
| 3,965,007 | 6/1976 | Conn et al. | 210/169 |
| 3,994,811 | 11/1976 | Cohen et al. | 210/169 |
| 4,265,751 | 5/1981 | Willinger | 210/169 |
| 4,427,548 | 1/1984 | Quick, Jr. | 210/617 |
| 4,764,311 | 8/1988 | Klaes | 261/28 |

Primary Examiner—Richard V. Fisher
Assistant Examiner—Robert A. Simpson
Attorney, Agent, or Firm—Charles D. Gunter, Jr.

[57] ABSTRACT

A filtration system for an aquarium is shown which includes a biological filter chamber having an inlet supplied with aquarium water to be filtered, an outlet for returning filtered water to the aquarium, and an interior containing a biological filter medium. A trickle plate is located at the inlet to the biological filter chamber for supplying an even distribution of water to the filter medium. A stationary spray bar located above said trickle plate and connected to the inlet, the stationary spray bar being provided with apertures for supplying water to the trickle plate. A reservoir chamber is located below the biological filter chamber and contains a protein skimmer and one or more supplemental filter stations for further filtering the water before recirculating the water to the aquarium.

17 Claims, 2 Drawing Sheets

AQUARIUM FILTRATION SYSTEM WITH LIQUID DISTRIBUTOR AND PROTEIN SKIMMER

BACKGROUND OF THE INVENTION

1. Field of the Invention

The present invention relates to an improved apparatus and method for maintaining the purity of water used in an aquarium water recirculating system, particularly for salt water/reef and invertebrate tanks, including an improved protein skimmer for use in such an apparatus and method.

2. Description of the Prior Art

A main object of aquarium maintenance is to maintain the captive aquatic life in a state of health approximating that which would be enjoyed by the captive species in a normal existence outside captivity. One factor in achieving this goal is to control the population density of the life maintained within the aquarium. However, even with optimum population density within the closed loop system, during life cycle processes, dissolved proteinaceous compounds form from many sources within the tank including leftover food, aquatic life wastes, and decaying plants and animals. Environmental bacteria then break down these compounds into ammonia which is converted to nitrates and nitrites by other bacteria. All of these later compounds ($NH_3$, nitrates, nitrites) eventually reach levels which will destroy the aquatic life unless steps are taken to control their level.

A variety of mechanical filters are known in the prior art which utilize, e.g., gravel, glass wool, diatomaceous earth, and the like to control the level of debris and waste materials in aquarium water. However, these devices suffer from the disadvantage of being unable to remove dissolved compounds from the aquarium water. Biological filters are also known in the prior art which utilize helpful bacteria (nitrosomonas and nitrobacters) which are, for instance, cultivated in the sand or gravel of the aquarium filter bed to convert ammonia to less toxic forms. This mechanism is described, e.g., in *Fish And Invertebrate Culture*, Water Management In Closed Systems, Steven H. Spotte, Wiley Interscience, 1970.

Protein skimmers have also been used in the past in the marine aquarium environment to control the level of toxic compounds in aquarium water by the technique of foam removal of dissolved protein compounds from the water. See, for instance, U.S. Pat. No. 3,965,007, issued June 22, 1976, to Conn et al.

In spite of these advances, the prior art filtration systems have suffered from a number of deficiencies. Subgravel biological filter systems typically lack sufficient surface area to effectively remove toxic substances from the tank water where any significant fish population exists. External biological filters have typically failed to effectively disperse the inlet water supply to the filter material in which the helpful bacteria are cultivated, thereby leading to the formation of dead spots within the external filter media. The protein skimmers used in the prior art biological filtration systems were typically configured as vertically oriented, hollow columns or chambers. As a result, the travel time of the air bubbles up the vertical column did not provide sufficient contact time with the water being treated to effectively remove dissolved protein materials from the aquarium water.

An object of the present invention is to provide a more efficient mechanical/chemical/biological filter to remove the main source of toxic compounds from aquarium water to prevent harm to the captive aquatic life maintained in the aquarium.

Another object of the invention is to provide an improved protein skimmer for use in such a system which provides improved foam separation for removing proteins, colloids and soluble high molecular weight compounds from aquarium water.

Another object of the invention is to provide an improved aquarium filter having chambers molded from synthetic materials which are long lasting and resistant to breakage.

Another object of the invention is to provide an apparatus which fits conveniently beneath most aquarium stands.

Additional objects, features and advantages will be apparent in the written description which follows.

SUMMARY OF THE INVENTION

The filtration system of the invention includes a biological filter chamber which is preferably molded from a synthetic, translucent material having an inlet supplied with aquarium water to be filtered, an outlet for returning filtered water to the aquarium, and an interior containing a biological filter medium. A trickle plate is located at the inlet to the biological filter chamber for supplying an even distribution of water to the filter medium. A stationary spray bar located above the trickle plate and connected to the inlet is provided with a plurality of apertures for supplying water to the trickle plate. Preferably, the trickle plate has a tray bottom, opposing sidewalls and an open top, the bottom being provided with a plurality with evenly spaced depressions for collecting and uniformly distributing the water passing from the spray bar to the biological filter medium. The tray bottom can also contain a foam filter pad for mechanically filtering the water passing from the spray bar.

Preferably, a molded reservoir chamber is located below the biological filter chamber and has a bottom and opposing sidewalls which define a main region of the reservoir. A protein skimmer is at least partly immersed within the main region of the reservoir and has a vertical inlet opening which communicates with the biological filter chamber outlet. Water from the biological filter chamber is fed through the vertical inlet opening to the protein skimmer. The protein skimmer includes an oxygenating passage supplied with a source of air under pressure. The oxygenating passage includes a ramp region which slants upwardly at an inclined angle from the reservoir bottom in the direction of the vertical inlet opening, whereby the ramp region serves to provide a longer effective path for the air bubbles leaving the air source, as the bubbles travel from the air source upwardly along the oxygenating passage toward an outlet of the skimmer. The skimmer can also be provided with a cross-flow path located below the vertical inlet opening for routing at least a portion of the incoming water from the vertical inlet opening to an isolated region of the reservoir chamber. In this way, water entering the protein skimmer can be directed to an isolated region of the reservoir and routed through supplemental filter materials prior to returning to the main region of the reservoir and being returned to the aquarium tank.

BRIEF DESCRIPTION OF THE DRAWINGS

in FIG. 3;

in FIG. 5.

DETAILED DESCRIPTION OF THE INVENTION

Figure 1:
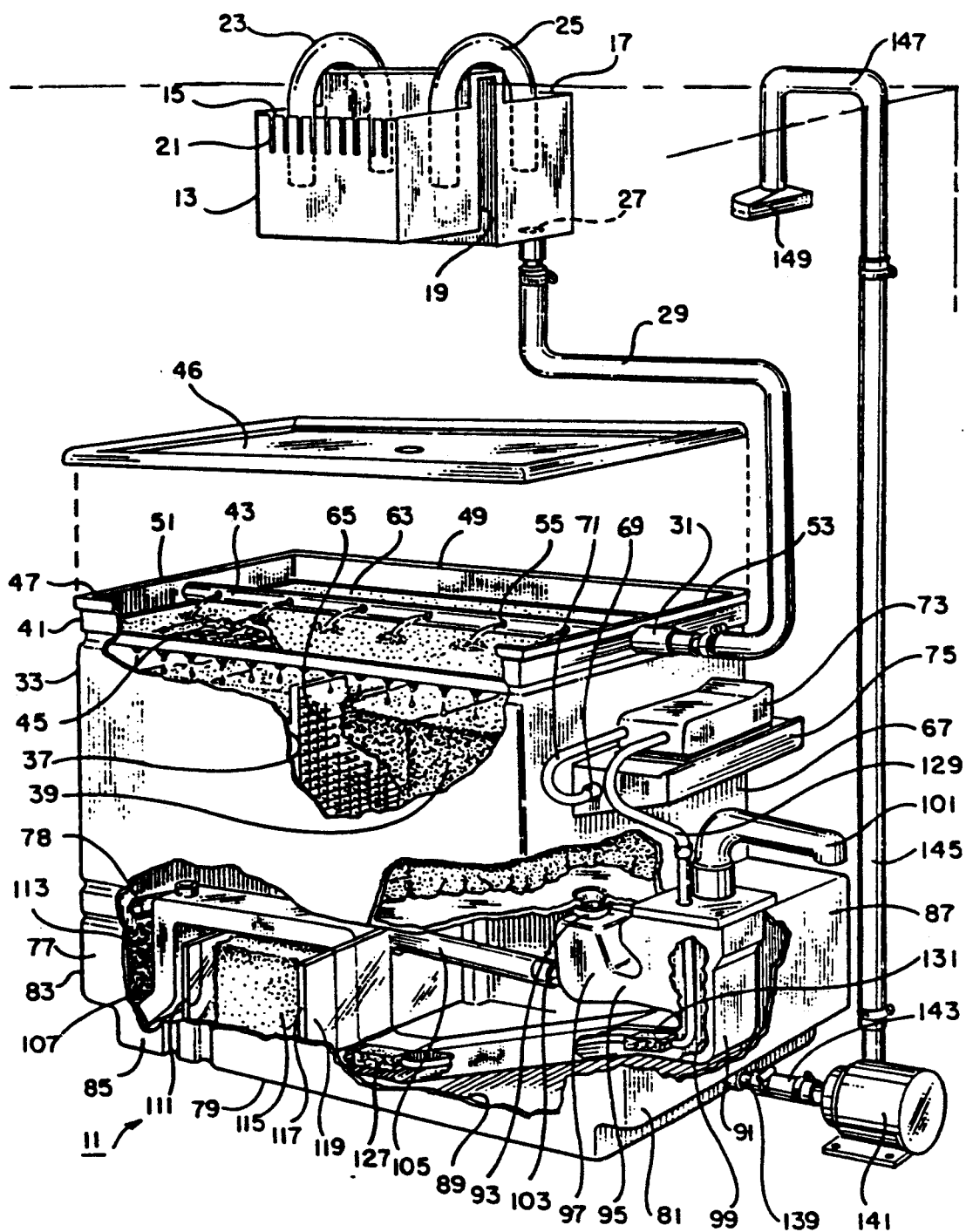
FIG. 1 is a front, perspective view of the apparatus of the invention with portions exploded and portions broken away for ease of illustration.

FIG. 1 shows a filtration system of the invention designated generally as 11. The system 11 is adapted for use with an aquarium maintained for viewing by the public, by the private aquarist, by aquatic researchers, or for use in a close loop aqaculture system. The system is particularly well suited for use with salt water/reef and invertebrate tanks. In a typical setting, the system 11 would fit beneath the tank being maintained on the tank stand. Water from the aquarium can conveniently be introduced to the system 11 through the use of an overflow box 13 having primary and secondary compartments 15, 17, respectively. A central recess 19 allows the compartments 15, 17 to be supported on a vertical sidewall at the rear of the aquarium tank (indicated in dotted lines in FIG. 1) with the primary compartment 15 being submerged to the approximate depth of its intake slots 21 within the tank water. The primary compartment 15 thus acts as an overflow box and as a surface skimmer by restricting the entrance of gross objects through the intake slots 21. One or more siphon tubes 23, 25 allow water to flow from the primary compartment 15 to the secondary compartment 17. Water is withdrawn through an outlet 27 and passes through a connecting conduit 29 to the side mounted inlet 31 of a biological filter chamber 33.

The biological filter chamber 33 is a generally rectangular compartment having a single outlet (35 in FIG. 2) and having an interior 37 containing a biological filter medium 39 sufficient to grow helpful bacteria, i.e., nitrosomonas and nitrobacters of the type used to break down ammonia to less harmful compounds. A variety of biological filter mediums exist including synthetic foam materials, ceramic and glass balls, crushed stone, gravel, and the like. The preferred material is an open-cell, imploded synthetic foam material which allows fluid to freely flow through the foam to the outlet 35. Particularly preferred is a 20 ppi (openings per linear inch) polyether, open cell, imploded foam. A polyurethane foam material suitable for the present purposes is described in U.S. Pat. No. 3,957,017, issued May 18, 1976. However, the polyether foam is preferred since it is more resistant to degradation with time in a salt water environment.

The incoming water is evenly distributed to the biological filter medium 39 by means of a trickle plate 41 and stationary spray bar 43. The trickle plate 41 has a tray bottom 45, opposing sidewalls 47, 49, 51, 53 and an open top. The open top can be covered by a lid 46 in use. The spray bar 43 communicates with the plate inlet 31 and has a plurality of apertures 55 spaced along the length thereof for distributing incoming water to the plate bottom 45.

Figure 4:
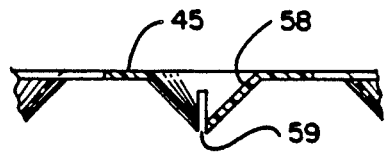
FIG. 4 is a cross-sectional view taken along lines IV.—IV.
Figure 5:
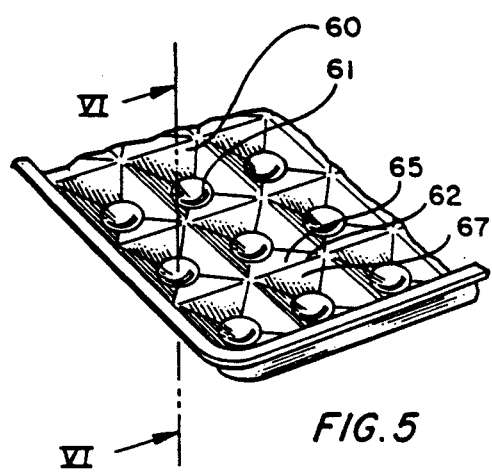
FIG. 5 is a perspective view, partly broken away of another embodiment of the trickle plate used with apparatus of FIG. 1.
Figure 6:
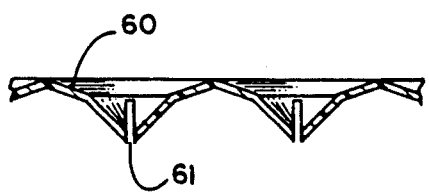
FIG. 6 is a side, cross-section view taken along lines VI.—VI.

As shown in FIGS. 3–6, the bottom 45 of the trickle plate 41 is provided with a plurality of evenly spaced depressions 57 for collecting and distributing the water passing from the spray bar 43 to the biological filter medium 39. The depressions can conveniently comprise semi-spherical recesses having sidewalls 58 which gently slope to a central opening 59, as shown in FIG. 4, or can have polygonal sidewalls which slope downwardly to a semi-spherical recess and central opening 61, as shown in FIG. 5 and 6. While the depressions 57 are evenly spaced-apart by the intervening tray bottom 45, the sidewalls 60 of the polygonally shaped recesses meet in a series of crests, e.g. crest 62 formed at the juncture of sidewalls 64, 66 in FIG. 5. By whatever design, the depressions should collect and funnel the incoming water to the water distribution openings 59, 61. In this way, the water is funnelled from the tray bottom and evenly distributed over the biological filter medium 39 to eliminate dead spots and maximize bacteria growth.

A foam pre-filter, such as foam pad 63 (FIG. 1) can be provided in the bottom of the trickle plate 41 to serve as a gross, mechanical filter for the incoming water. One or more vertical grates 65 can also be provided in the interior 37 of the chamber 33 to separate the biological filter media into vertical stations which can be cleaned one at the time.

As shown in FIG. 1, one of the vertical sidewalls 67 of the biological filter chamber is preferably provided with a holder 75 for an air pump 73. The holder 75 can be provided as a part of the molded chamber 33, the holder being located on the sidewall 67 above the level of the water in the chamber 33. The molded holder 75 preferably has a hollow interior and has an oxygenator inlet 69 which is connected by tubing 71 to the double outlet air pump 73. The air pump injects oxygen into the biological filter medium 39 by means of the pathway formed in the holder 75, creating explosive bacterial growth and contributing to the increased redox potential of the system.

A molded reservoir chamber 77 is located below the biological filter chamber 33 and has a bottom 79 and opposing sidewalls 81, 83, 85, 87 which define a main interior region 89 of the reservoir. As best seen in FIG. 1, a protein skimmer 91 is partly immersed within the main interior region 89, the protein skimmer having a vertical inlet opening 93 which communicates with the biological filter chamber outlet 35. The inlet opening 93 communicates with a horizontal channel region 95 by means of a vertical passage 97. The channel region 95, in turn, communicates with an extraction chamber 99 having an extractor spout 101.

As shown in FIG. 1, the vertical passage 97 has a side opening 103 which is connected to a cross-flow path 105 located below the vertical inlet opening 93 for routing at least a portion of the incoming water from the vertical inlet opening 93 to an isolated region 107 of the reservoir chamber 77 where it is discharged from opening 78. By "isolated region" is meant the region of the reservoir chamber 77 distant from the location of the vertical inlet opening 93 and channel region 95 of the protein skimmer. Preferably, about 55-75% of the water entering the inlet opening 93 is diverted through the cross-flow path 105 to the remote region 107.

The remote region of the reservoir chamber 77 preferably contains a chemical filter medium, such as activated carbon 113. A vertical grate 111 preferably separates the activated carbon 113 in the left-most filter station from an intermediate filter material 115 contained in an intermediate filter station 117. The intermediate filter material 115 could be, for instance, synthetic foam, glass wool or the like, or could comprise a denitrifying station. A vertical grate 119, in turn, separates the intermediate filter medium 115 from the main interior region 89 of the reservoir chamber 77. Although the activated carbon station 113, intermediate filter station 117 and main interior region 89 are defined by the vertical grates 111 and 119, it will be understood that water circulates through the respective stations from the opening 78 of cross-flow path 105 in a left to right direction as viewed in FIG. 1 toward the main interior region 89, by virtue of the water in the reservoir chamber 33 seeking its own level.

Figure 2:
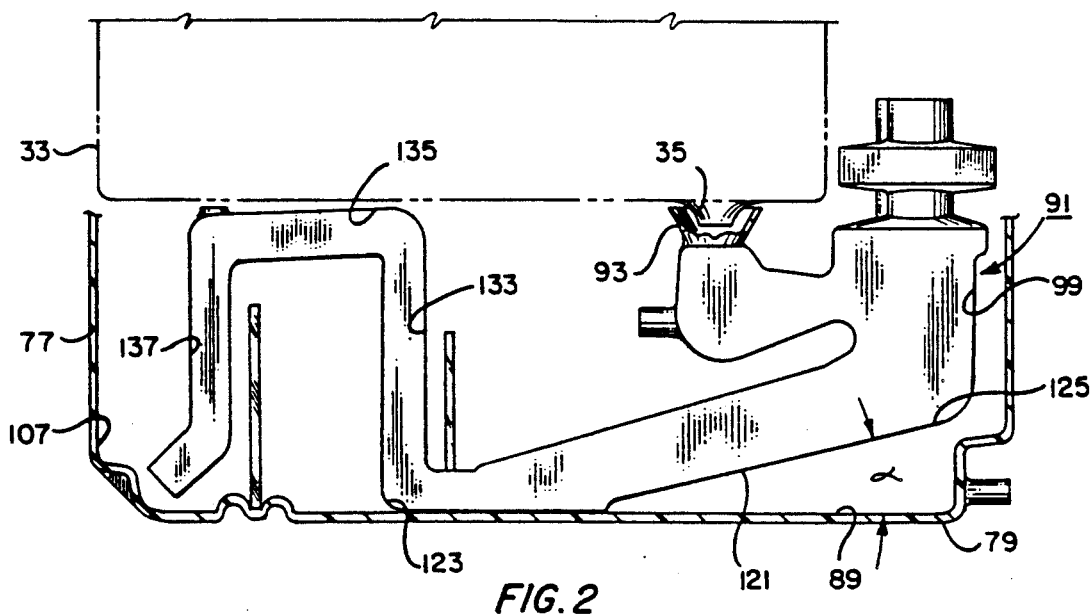
FIG. 2 is an isolated view of the protein skimmer used in the reservoir chamber of the apparatus of FIG. 1.
Figure 3:
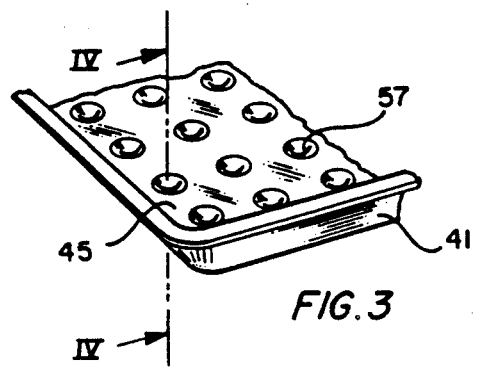
FIG. 3 is a perspective view, partly broken away of one embodiment of the trickle plate used with the apparatus of FIG. 1.

As shown in FIG. 2, the protein skimmer 91 includes an oxygenating passage supplied with air under pressure. The oxygenating passage communicates the vertical inlet opening 93 and the isolated region 107 of the reservoir chamber 77 and includes a ramp region 121 which slants upwardly at an inclined angle from the reservoir bottom 79 in the direction of the vertical extraction chamber 99. Preferably, the ramp region 121 is generally rectangular in cross-section and forms an actuate angle alpha of about 25°-40° with respect to the reservoir bottom 79.

The ramp region 121 has a lower end 123 and an upper end 125. An air supply source such as a commercially available air diffuser block 127 (FIG. 1) located at the ramp lower end 123 is connected by tubing 129 to the air pump 73. A supplementary air diffuser block 131 can also be included in the tubing 129 at the entrance to the extraction chamber 99. Since the air diffuser block 127 dispenses air bubbles adjacent the ramp lower end 123, the inclined angle alpha of the ramp region serves to provide a longer effective path for the air bubbles as the bubbles travel from the source 127 upwardly toward the extraction chamber 99. Because the ramp region 121 is not a vertical chamber, the air bubbles generated by the diffuser 127 have increased contact time with the water in the ramp region 121 thereby increasing the foam flotation separation of waste froth in the extraction chamber 99.

A portion of the water entering the protein skimmer 91 flows by means of vertical leg 133, horizontal leg 135 and downwardly extending spout 137 to the isolated region 107 of the reservoir chamber 77. The direction of flow of water passing through the channel region 95 and into the ramp region 121 is counter to the direction of travel of air bubbles passing from the source 127 to the extraction chamber 99.

The protein skimmer 91 can also be provided as a stand alone unit which is not contained within a surrounding reservoir by routing the incoming water to the inlet 93 and by routing the water from the cross flow path 105 and spout 137 back to the aquarium. The cross flow path 105 can also be closed off in stand alone embodiments.

A discharge outlet 139 (FIG. 1) leads from the main interior region 89 of the reservoir chamber 77 to a discharge pump 141 for circulating water from the discharge outlet 139 through conduits 143, 145 to an elbow 147. The elbow 147 rests on the vertical sidewall of the aquarium tank (shown in dotted lines in FIG. 1) being filtered and is connected to a discharge head 149 within the tank.

The main components of the system 11 are preferably molded as single pieces, for instance, by rotational molding, vacuum forming, blow molding, or injection molding. Preferably, the biological filter chamber 33, reservoir chamber 77 and protein skimmer 91 are rotationally molded from synthetic materials. In rotational molding, the product is formed inside a closed mold or cavity where the mold is rotated biaxially in a heating chamber. To obtain the mold rotation in two planes perpendicular to each other, a spindle is rotated on a primary axis, while the mold is rotated on a secondary axis. In the loading stage, either liquid or powered plastic is then charged into a hollow mold. The mold halves are then clamped shut and moved into an oven where the loaded mold spins biaxially.

In the oven, heat penetrates the mold causing the plastic, if it is in powder form, to become tacky and stick to the mold surface, or if it is in the liquid form, to start to gel. Usually, the heating is done by air or by liquid of high specific heat, such as molten salt. Since the mold continues to rotate while the heating is going on, the plastic will gradually become distributed evenly on the mold cavity walls through gravitational force. As the cycle continues, the synthetic material melts completely and forms a homogeneous layer of molten plastic.

When the parts have been formed, the mold is moved to a cooling chamber where cooling is accomplished by either a cold spray of water and/or forced air or liquid circulation inside the mold. The mold continues to be rotated during the cooling cycle. Additional details on rotational molding can be found in the *Plastics Engineering Handbook of the Society of Plastics Inc.*, 4th Edition, Editor J. Frados, Nostrand-Reinhold Publishers, and will be familiar to those skilled in the art.

Because the biological filter chamber 33 is rotationally molded from a synthetic plastic, it can be appropriately dyed to produce a translucent product which limits the amount of external light entering the unit. By "translucent" is meant partially transparent, i.e., letting light pass but diffusing it so that objects on the other side cannot be distinguished. The use of a translucent material over a clear plastic has been found to be beneficial for desired bacterial growth in the biological filter medium.

An invention has been provided with several advantages. The rotationally molded components of the system are less resistant to breakage during shipment and use. The biological filter chamber can be molded from a translucent synthetic material which facilitates the growth of bacteria within the chamber. The stationary spray bar and trickle plate aerate the entering water and direct it evenly over the biological filter medium in the biological filter chamber. The even distribution of water over the biological filter medium prevents the formation of dead spots and assists in maintaining a high oxygen level within the filter medium. The oxygenator inlet provided in the sidewalls of the filter chamber injects oxygen to promote bacteria growth.

The unique protein skimmer design provides increased contact time between the air bubbles from the air source and the water contained within the ramp region to more effectively separate toxic substances for removal through the extraction chamber. The cross-flow path provided in the reservoir chamber, along with the protein skimmer, direct all of the water from the biological filter chamber to an isolated region of the reservoir chamber so that the water can be additionally filtered thru supplemental filter stations having selected filter materials. After supplemental filtration in the additional filter stations, the water is returned to the main interior region of the reservoir chamber for discharge back to the aquarium.

While the invention has been shown in only one of its forms, it is not thus limited but is susceptible to various changes and modifications without departing from the spirit thereof.

I claim

1. A filtration system for an aquarium, comprising:
   a biological filter chamber having an inlet supplied with aquarium water to be filtered, an outlet for returning filtered water to the aquarium, and an interior containing a biological filter medium;
   a trickle plate located at the inlet to said biological filter chamber for supplying an even distribution of water to said filter medium; and
   a stationary spray bar located above said trickle plate and connected to said inlet, said stationary spray bar being provided with a plurality of apertures for supplying water to said trickle plate.

2. The filtration system of claim 1, wherein said trickle plate has a tray bottom, opposing sidewalls and an open top, said tray bottom being provided with a plurality of evenly spaced depressions for collecting and distributing the water passing from said spray bar to said biological filter medium.

3. The filtration system of claim 2, wherein said depressions are generally semi-spherically shaped and terminate in water distribution openings, the depressions being selectively spaced to funnel water from the tray bottom and evenly distribute said water over the biological filter medium to thereby eliminate dead spots and maximize bacteria growth.

4. The filtration system of claim 1, wherein said biological filter chamber is molded from a translucent synthetic material to promote the growth of beneficial bacteria in the biological filter medium.

5. The filtration system of claim 2, further comprising:
   a synthetic foam pre-filter pad located in said tray bottom below said stationary spray bar.

6. The filtration system of claim 5, wherein the biological filter chamber has opposing sidewalls, one of said sidewalls being provided with an oxygenator inlet for supplying air under pressure to said biological filter medium.

7. A filtration system for an aquarium, comprising:
   a biological filter chamber having an inlet supplied with aquarium water to be filtered, an outlet for dispensing filtered water, and an interior containing a biological filter medium sufficient to grow nitrosomonas and nitrobacter organisms;
   a reservoir chamber located below said biological filter chamber, said reservoir chamber having a bottom and opposing sidewalls which define a main interior region of said reservoir, and having a protein skimmer which is at least partly immersed within said main interior region, said protein skimmer having a vertical inlet opening which communicates with said biological filter chamber outlet, whereby water from said biological filter chamber is fed to said vertical inlet opening, and wherein said protein skimmer has a crossflow path located below said vertical inlet opening for routing at least a portion of the incoming water from said vertical inlet opening to an isolated region of said reservoir chamber, said protein skimmer also having an extraction chamber outlet and including an oxygenating passage with means supplying air under pressure, said oxygenating passage communicating said vertical inlet opening and said isolated region of said reservoir, said oxygenating passage including a ramp region which slants upwardly at an inclined angle from said reservoir bottom in the direction of said extraction chamber outlet.

8. The filtration system of claim 7, wherein said ramp region of said oxygenating passage has a lower end and an upper end, and wherein said air supply means dispenses air bubbles adjacent said lower end, the inclined angle of the ramp region serving to provide a longer effective path for said air bubbles as said bubbles travel from said source upwardly toward said extraction chamber outlet.

9. The filtration system of claim 8, wherein the direction of flow of water entering said vertical inlet opening of said skimmer and passing through said oxygenating passage is counter to the direction of travel of air bubbles passing from said air supply means to said extraction chamber outlet.

10. The filtration system of claim 7, wherein said isolated region of said reservoir chamber contains a chemical filtration medium.

11. The filtration system of claim 10, further comprising an intermediate filter station located between said isolated region and said main reservoir region.

12. A filtration system for an aquarium, comprising:
    a biological filter chamber having an inlet supplied with aquarium water to be filtered, a single water outlet, and an interior containing a biological filter medium sufficient to grow nitrosomonas and nitrobacter organisms;
    a trickle plate located at the inlet to said biological filter chamber for supplying an even distribution of water to said filter medium;
    a stationary spray bar located above said trickle plate and connected to said inlet, said stationary spray bar being provided with a plurality of apertures for supplying water to said trickle plate;
    a reservoir chamber located below said biological filter chamber, said reservoir chamber having a protein skimmer which is at least partly immersed within a main region of said reservoir, said protein skimmer having a vertical inlet opening which communicates with said biological filter chamber outlet, whereby water from said biological filter chamber is gravity fed to said vertical inlet opening, and wherein said protein skimmer has a crossflow path located below said vertical inlet opening for routing at least a portion of the incoming water from said vertical inlet opening to an isolated region of said reservoir chamber;
    a discharge outlet from said main region of said reservoir; and
    a discharge pump for circulating water from said discharge outlet to an aquarium to be filtered.

13. A protein skimmer for use in foam flotation separation of toxic compounds from aquarium water, the skimmer comprising:
    a skimmer body having a water inlet opening, a water outlet, and a foam extraction outlet;
    an oxygenating passage communicating the water inlet opening and the water outlet, said oxygenating passage including a ramp region having a lower end and an upper end, said ramp region slanting upwardly at an inclined angle from said lower end toward said upper end, and wherein an air supply means is located adjacent said lower end for dispensing air bubbles, the inclined angle of the ramp region serving to provide a longer effective travel path for said air bubbles as said bubbles travel from said air supply source upwardly along said ramp toward said foam extraction outlet.

14. The protein skimmer of claim 13, wherein said ramp region is generally rectangular in cross-section.

15. A protein skimmer and reservoir chamber combination for use in foam flotation separation of toxic compounds from aquarium water, the combination comprising:
   a reservoir chamber having a chamber bottom and opposing sidewalls which define an interior for holding aquarium water to be filtered;
   a skimmer body at least partly immersible within said reservoir chamber having a vertical inlet opening for entering water to be filtered and having a foam extraction chamber;
   said protein skimmer body including an oxygenating passage, said oxygenating passage including a ramp region having a lower end and an upper end, said ramp region slanting upwardly at an inclined angle from said lower end toward said upper end; and
   an air supply means located adjacent said lower end for dispensing air bubbles, the inclined angle of the ramp region serving to provide a longer effective travel path for said air bubbles as said bubbles travel from said air supply source upwardly along said ramp toward said foam extraction chamber.

16. The protein skimmer of claim 15, further comprising:
   a cross-flow path located below said vertical inlet opening for routing at least a portion of the incoming water from said vertical inlet opening to said reservoir chamber.

17. The protein skimmer of claim 16, wherein the direction of flow of water entering said vertical inlet opening of said skimmer and passing through said oxygenating passage is counter to the direction of travel of air bubbles passing from said air source to said foam extraction outlet.

* * * * *